N. ROMANO.
OILLESS SPINDLE.
APPLICATION FILED AUG. 5, 1912.
1,075,858.
Patented Oct. 14, 1913.
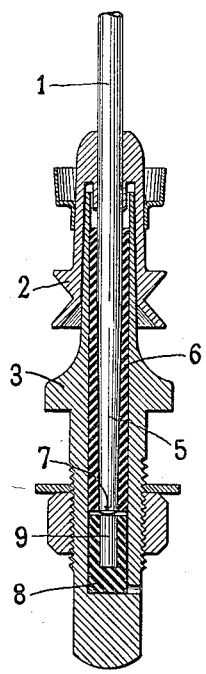
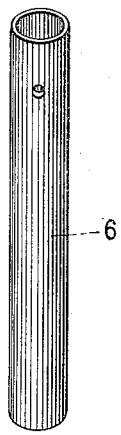
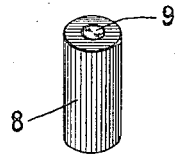
INVENTOR
Nicholas Romano,

UNITED STATES PATENT OFFICE.

NICHOLAS ROMANO, OF BOUNDBROOK, NEW JERSEY, ASSIGNOR, BY MESNE ASSIGNMENTS, TO THE GRAPHITE LUBRICATING COMPANY, OF BOUNDBROOK, NEW JERSEY, A CORPORATION OF NEW JERSEY.

OILLESS SPINDLE.

1,075,858.      Specification of Letters Patent.      Patented Oct. 14, 1913.

Application filed August 5, 1912. Serial No. 713,446.

*To all whom it may concern:*

Be it known that I, NICHOLAS ROMANO, a citizen of the United States, and a resident of Boundbrook, in the county of Somerset and State of New Jersey, have invented certain new and useful Improvements in Oilless Spindles, of which the following is a full, clear, and exact description, whereby any one skilled in the art may make and use the same.

The invention relates to oil-less spindles and more particularly to the bearing for the spindle which may be adapted to the particular type of spindle herein shown or may be utilized in any form of spindle.

The object of the invention is to provide a bearing for a spindle which will be self lubricating due to its inherent qualities rather than to an oil bath.

A further object is to use a bearing having characteristics by which, under rapid rotation of the spindle, an adequate quantity of lubricant will be supplied to maintain free running, full lubrication and long wearing qualities for the bearing.

Referring to the drawings: Figure 1 is a view in side elevation of a spindle of well known type. Fig. 2 is a detail view of the bearing and of the bolster bearing and step bearing in vertical section. Fig. 3 is a detail view in perspective of the bolster shown in Fig. 2. Fig. 4 is a view of the step bearing.

The spindle herein shown and described is of ordinary type having the usual component parts of a spindle, namely, the spindle, whirl, bolster bearing, step bearing and oil cup inclosing the bolster and step bearings. In the ordinary type of spindle, the oil cup or casing which is supported in the rail and bears the various parts of the spindle enumerated above is filled with oil in order to secure free lubrication of the spindle. Various forms of bolsters have been employed, including metals, fiber, fibrous packings of wicking and wicking combined with metals, but so far as known in all these structures, a bath of oil has been provided in the oil cup for maintaining proper lubrication and keeping the spindle bearings cool.

It is one of the principal objects of the present invention to entirely do away with the necessity of liquid lubricants and to this end the invention contemplates the use of a bolster bearing and step bearing formed of a fibrous material completely and thoroughly impregnated with a lubricating material such, for instance, as fatty acids, waxes and mineral and vegetable oils.

It has been ascertained from practice that bearings formed from materials of the character hereinafter defined give perfect and complete lubrication to the rapidly rotating spindle. It has also been found that using a fibrous bolster in conjunction with a purely fibrous step bearing results in a wear upon the step which permits a sufficient drop of the spindle in the bolster to cause undue heat and wear. It has also been found that the use of a fibrous bolster with a metallic step bearing produces heat to such a degree that the lubricant is withdrawn from the bolster to such an extent as to impair its usefulness as a self-lubricating bearing.

One of the principal objects of the invention herein described resides in an arrangement of fibrous bolster and step bearing with a sufficient metal contact between the step and the spindle to prevent quick wearing of the step bearing and yet developing a requisite amount of warmth or heat to maintain proper lubrication of the parts without undue wear.

Referring to the drawings, the numeral 1 denotes the spindle blade having the usual whirl 2 encircling the oil cup 3, which is mounted in the spindle rail 4.

Within the oil cup and surrounding the lower end of the spindle 5, is arranged a tapered fibrous bushing or bearing 6, which takes the place of the ordinary bolster bearing. The end of the spindle in lieu of being sharply pointed is preferably left quite blunt as indicated at 7, and this blunt end bears upon the step block or bearing 8, which is also formed of fibrous material of a lubricating nature. At or near the center of this step bearing, there is an inserted plug 9, of metal preferably hardened steel, which registers with the lower end of the spindle and which extends into the block an appreciable distance which, of course, may be varied with the length of the block employed.

Obviously, were it not for the hardened metallic piece 9, there would be a tendency for the end of the spindle to cut into the fibrous step bearing and thereupon the beveled sides of the spindle would rest more firmly in the beveled bearing of the fibrous bolster 6, thus placing a cramp on the rotating spindle. This results in causing undue heat and wear on the bolster.

It has been found that where the fibrous bolster has the proper angles and surface contact with the spindle and a perfect bearing is maintained that most efficient results are secured as to wear, lubrication and lack of heat, by utilizing a bolster such as herein defined without a liquid lubricant in the oil cup.

As both the bolster and the step bearing are impregnated with a lubricant which has a melting point far above the ordinary heats developed by a spindle running under well lubricated conditions, the lubrication of the bolster with reference to the spindle is perfect so long as it is maintained in its prescribed bearing position.

The hardened plug 9, inserted in the step bearing and forming a bearing contact for the end of the dull spindle prevents settling of the spindle blade and, during the rotation of the spindle, the contact between the lower end thereof and the hardened plug develops just sufficient heat to draw a minute quantity of lubrication from the saturated block or step bearing 8. As soon as the lubrication is effective, there is no further exhuming of lubricant from the block as, of course, the bearing runs cool. Therefore, the heat generated by the bearing at the end of the spindle upon the metal block of the step bearing, is just sufficient to draw a requisite quantity of lubricant from the bolster and step on to the spindle at its various bearing points. The spindle does not overheat, but runs smoothly in a well lubricated bearing without the use of liquid lubricants which are so apt to boil and fly beyond the oil cup.

There is a further advantage in that there is no liability of accumulating oil and dust due to the oily condition of the spindle support and the bolster and step bearings may be removed, renewed and adjusted without soiling the spindle frame or the goods. Obviously, the exact details and form of the bearing and spindle are not material and may be varied to suit the exigencies of any particular type of device, the main purpose of the invention being to provide a self-lubricating fibrous bearing into which the spindle shank will not settle or wear and which from its construction will produce just sufficient heat to give ample lubrication.

What I claim as my invention and desire to secure by Letters Patent is:

1. An oil-less spindle having a supporting cup, whirl and spindle blade, a bolster bearing of fibrous material impregnated with a lubricant, a step bearing of fibrous material likewise impregnated and having a metallic plug axially arranged therein and extending from the face of the plug downward into the fibrous material, said plug having its upper end under-lying and in contact with the end of the spindle.

2. An oil-less spindle embodying a spindle blade, spindle bearing, whirl and supporting cup, a bolster and step bearing of hard fibrous material impregnated through and through with a lubricant of high melting point and arranged within the cup, said bolster having a tapered bearing surface fitting the taper of the spindle blade, said step bearing having a metallic plug extending into the body of the bearing from its upper face and arranged to be frictionally engaged by the end of the spindle whereby heat will be produced to draw a lubricating film from the bolster and step to the surface of the spindle blade.

3. An oil-less spindle having a supporting cup, whirl and spindle blade, a bolster of fibrous material impregnated with a lubricant, a step bearing of fibrous material likewise impregnated and having a metallic plug concentrically arranged therein and upon which plug the spindle bears.

4. A spindle bearing embodying a bolster and step formed of fibrous material impregnated with a lubricant, said step bearing having a metallic plug embedded therein and with its end in contact with the end of the spindle whereby the spindle and plug generate sufficient heat to withdraw lubricant from the step and bolster.

NICHOLAS ROMANO.

Witnesses:
C. SCHONECK,
LEIGH S. BACHE.

---

Copies of this patent may be obtained for five cents each, by addressing the "Commissioner of Patents, Washington, D. C."